United States Patent [19]

Lobanoff et al.

[11] Patent Number: 4,952,008
[45] Date of Patent: Aug. 28, 1990

[54] VISOR WITH SNAP-IN RETRACTABLE GLARE SHIELD

[75] Inventors: Mark Lobanoff, Troy; James A. Gavagan, Centerline, both of Mich.

[73] Assignee: Irvin Industries, Inc., Rochester Hills, Mich.

[21] Appl. No.: 484,468

[22] Filed: Feb. 22, 1990

Related U.S. Application Data

[63] Continuation of Ser. No. 286,994, Dec. 19, 1988, abandoned.

[51] Int. Cl.⁵ .............................................. B60J 3/02
[52] U.S. Cl. .................................... 296/97.8; 29/91.1
[58] Field of Search ................... 296/97.8, 97.1, 97.5; 29/91.1, 434, 453

[56] References Cited

U.S. PATENT DOCUMENTS

| | | | |
|---|---|---|---|
| 2,134,414 | 10/1938 | Norcross | 296/97.8 |
| 2,228,209 | 1/1941 | Harrington | 296/97.8 |
| 2,733,763 | 2/1956 | Nygaard | 296/97.8 |
| 3,343,867 | 9/1967 | Couch et al. | 296/97.8 |
| 3,375,364 | 3/1968 | Marcus | 296/97.1 |
| 4,264,100 | 4/1981 | Keeler, II | 296/97.8 |
| 4,323,275 | 4/1982 | Lutz | 296/97.8 |
| 4,353,593 | 10/1982 | Henson | 296/97.7 |
| 4,486,819 | 12/1984 | Marcus et al. | 296/97.1 |
| 4,491,360 | 1/1985 | Fleming | 296/97.8 |
| 4,541,663 | 9/1985 | Schwanitz et al. | 296/97.8 |
| 4,564,234 | 1/1986 | Kaiser et al. | 296/97.1 |
| 4,624,499 | 11/1986 | Flowerday | 296/97.1 |
| 4,690,451 | 9/1987 | Killar | 296/97.8 |
| 4,711,483 | 12/1987 | Gulette et al. | 296/97.1 |
| 4,728,142 | 3/1988 | Gavagan | 296/97.8 |
| 4,734,831 | 3/1988 | Keyser et al. | 296/97.1 |
| 4,736,979 | 4/1988 | Harvey | 296/97.6 |
| 4,810,023 | 3/1989 | Kamada | 296/97.8 |

Primary Examiner—Robert R. Song
Attorney, Agent, or Firm—Harness, Dickey & Pierce

[57] ABSTRACT

An improved sun visor assembly, particularly adapted for use with motor vehicles. The visor assembly has a retractable auxiliary glare shield featuring snap-in assembly into the visor and includes features which prevent inadvertent removal of the glare shield. An internal or external edge cap is provided which forms an outer edge of the visor and guides the auxiliary glare shield. The edge cap engages and secures the edges of the visor outer board around the opening for the auxiliary glare shield. On one preferred embodiment, an internal split end cap is provided, each half of which engages one of the edges of the outer board by means which allow exact location to allow the end cap halves to snap together permanently after being stitched to the wrapped-around soft trim and outer board. The visor thus has a normal appearance with the end cap which provides a firm opening for the glare shield, while the end cap being invisible.

32 Claims, 5 Drawing Sheets

VISOR WITH SNAP-IN RETRACTABLE GLARE SHIELD

This is a continuation of U.S. Pat. application Ser. No. 286,994, filed Dec. 19, 1988 Entitled: Visor With Snap-In Retractable Glare Shield, now abandoned.

BACKGROUND AND SUMMARY OF THE INVENTION

This invention relates to a motor vehicle visor and particularly to one that has an auxiliary retractable glare shield.

Motor vehicles are equipped with sun visors which are attached to the windshield header inside the vehicle and can be deployed to shield the occupant's eyes from annoying and possibly blinding sun or headlight glare. Visors are typically hinged at the outboard corners of the windshield header. The length of the visor is limited so that it does not interfere with the vehicle's inside rear view mirror. Most visors can be rotated about a vertical and horizontal axis to place them in a desired position. In certain driving conditions, however, the visor does not extend inboard far enough to prevent glare from annoying the vehicle occupant. Accordingly, there is a need to provide an improved visor having an auxiliary glare screen which can be extended to increase the effective length of the visor when needed and can be retracted to prevent interference with the inside rear view mirror. As with all components for mass produced motor vehicles, it is a further design objective to minimize the labor and time necessary to fabricate and assemble visor assemblies.

The visor assemblies according to this invention achieve the above mentioned desirable features. The visors have a retractable auxiliary glare shield which features simple snap-together assembly which minimizes labor time and skill requirements. The visors further include an edge cap which surrounds the opening slot for the glare shield providing a neatly trimmed opening. In accordance with a first embodiment, the edge cap is exposed whereas the second embodiment features an internal edge cap which is covered by soft trim.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

A visor assembly in accordance with this invention is shown in the appended drawings and is generally designated by reference number 10. Visor assembly 10 principally comprises center board assembly 12, outer board assembly 14, auxiliary glare shield 16, and edge cap 18.

Figure 1:
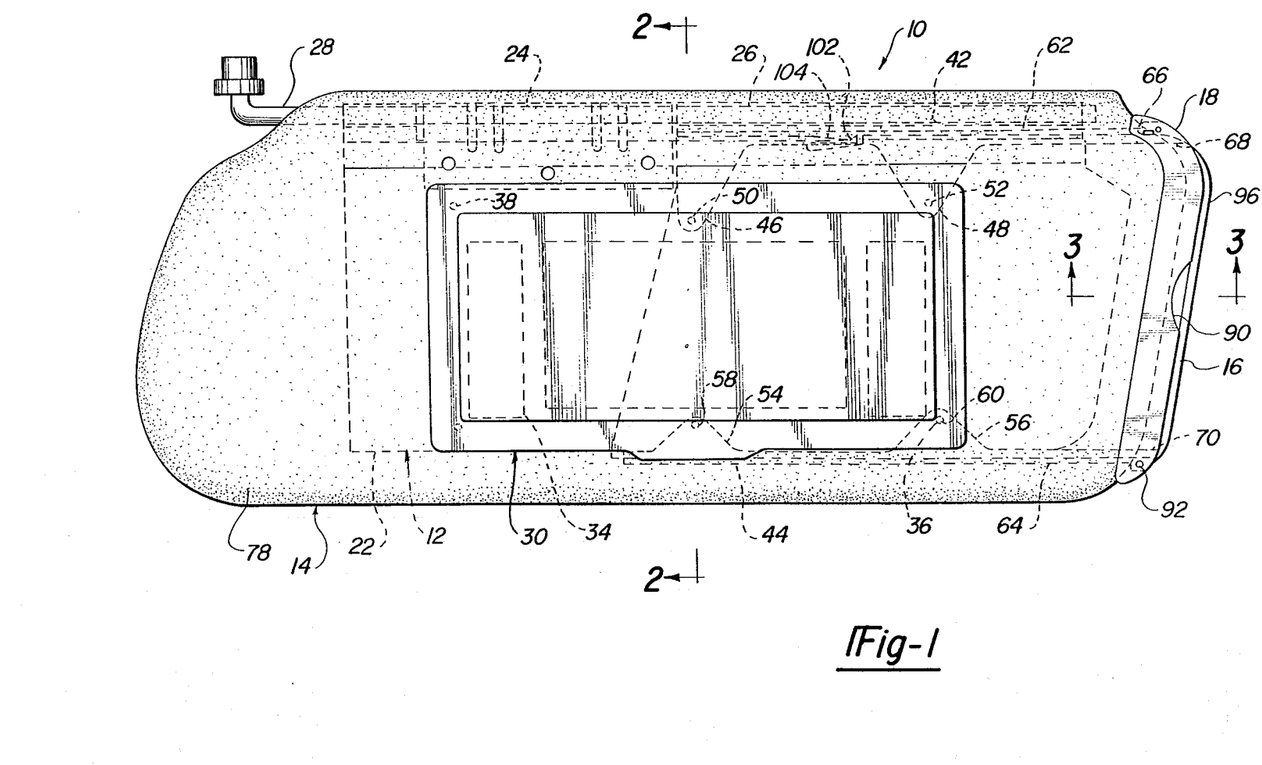
FIG. 1 is a plan view of the improved visor assembly according to a first embodiment of this invention showing, in phantom lines, the profiles of various internal components of a left hand visor assembly.
Figures 2, 3:
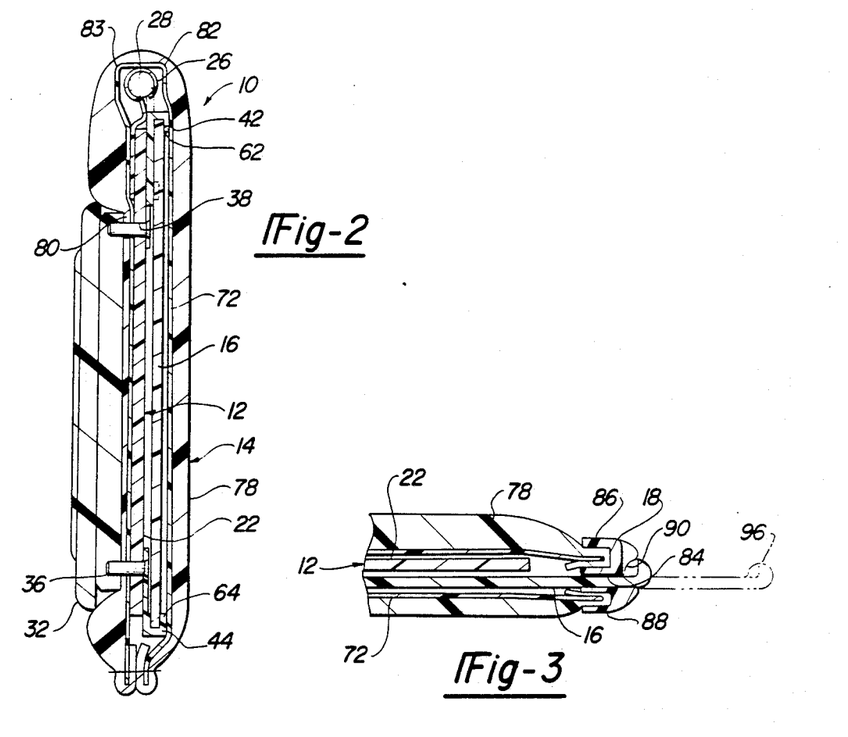
FIG. 2 is a cross-sectional view taken along line 2—2 of FIG. 1.
FIG. 3 is a partial cross-sectional view taken along line 3—3 of FIG. 1.
Figure 4:
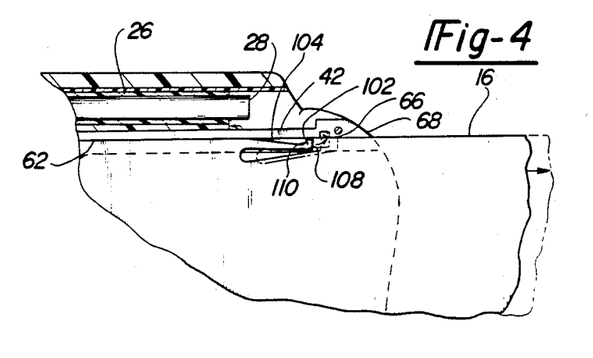
FIG. 4 is a partial sectional view showing the retractable glare shield being moved into and out of the visor assembly.

Center board assembly 12 has a center board panel 22 made from a stiff fibrous material. Along the upper edge of panel 22, as shown in FIG. 1, sheet metal clips 24 and 26 are provided which are formed to define aligned elongated bores which receive visor mounting post 28. Clips 24 and 26 engage the post but enable visor 10 to be rotated about post 28. The clips further exert frictional forces on post 28, enabling the visor to be moved to a desired position and remains there until an external force is applied by the user. As a customer convenience feature, many visor assemblies also feature an illuminated mirror assembly 30, having a flip-up opaque exterior door 32. Mirror assembly 30 includes light sources 34 which are illuminated once door 32 is opened. Mirror assembly 30 is directly attached to center board panel 22 through a number of protruding posts 36 which extend through holes 38 in the center panel. On the opposite face surface of panel 22, posts 36 are enlarged through the application of heat, or push nuts or tinnerman type nuts are installed on the studs to maintain mirror assembly 30 in place. As shown by the figures, mirror assembly 30 has a total of six posts 36 extending through center board panel 22.

Visor assembly 10 in accordance with this invention varies from typical prior art designs in that it includes a pull-out auxiliary glare shield 16. Upper guide 42 and lower guide 44 are fastened to center board panel 22 and are disposed on the opposite side of the panel from mirror assembly 30. Upper guide 42 forms tabs 46 and 48 having holes 50 and 52, respectively, which are positioned to receive a pair of mirror assembly posts 36. Similarly, lower guide 44 includes tabs 54 and 56 with holes 58 and 60, respectively. This configuration for upper and lower guides 42 and 44 enables them to be installed without reworking mirror assembly 30 or providing special mounting provisions for the guides. Guides 42 and 44 are secured as mentioned previously through heat staking or mechanical fasteners, as mentioned previously. Upper and lower guides 42 and 44 include glare shield tracks 62 and 64 having a generally letter "C" shaped cross-section which receives the upper and lower edges of glare shield 16. Upper guide 42 further forms a local pocket 66 near its extreme end. Guide ends 68 and 70 form the terminal ends of guides 42 and 44.

Outer board assembly 14 is constructed in accordance with prior art designs, and includes fiber board 72 which is scored along lines 82 and 83 to define a pair of generally symmetrical connected leaves 74 and 76. A soft padded fabric trim material 78 is bonded or otherwise attached to board 72 and overlaps the outer edges of the board to define a trimmed edge. Various means for attaching trim material 78 to board 72 may be employed, such as stitching, sonic or dielectric bonding, etc. For visor assemblies having a mirror assembly 30 as shown by the appended drawings, outer board leaf 76 forms central rectangular aperture 80 which surrounds and frames mirror assembly 30. In accordance with prior art constructions, center board assembly 12 is fully fabricated and is then enclosed by folding together leaves 74 and 76, whereupon the bottom and side edges of outer board assembly 14 are fastened together through stitching or bonding around its perimeter.

The outer surface of edge cap 18 is contoured to generally conform to the configuration of outer board assembly 14 along its inside edge. Edge cap 18 defines a central slot 84 which accommodates sliding of glare shield 16 and further has a pair of separated channels 86 and 88, each having a generally letter "C" shaped contour. Local depression 90 is provided to enable convenient grasping of glare shield 16, as described below. As shown in the figures, holes 92 enable edge cap 18 to be secured by pins or threaded fasteners to guide ends 68 and 70.

Auxiliary glare shield 16 is a generally planer member which can be made from opaque, translucent or transparent material, as desired. The exposed outer end of glare shield 16 includes rib 96 with a central cut-out portion 98 provided for convenient grasping by the user. Glare shield 16 further includes projecting tab 102 formed at the end of cantilever arm 104, which are formed integrally with the glare shield. Tab 102 has a flat end surface 108 generally perpendicular to the upper edge of glare shield 16 and a ramped side surface 110.

Figure 5:
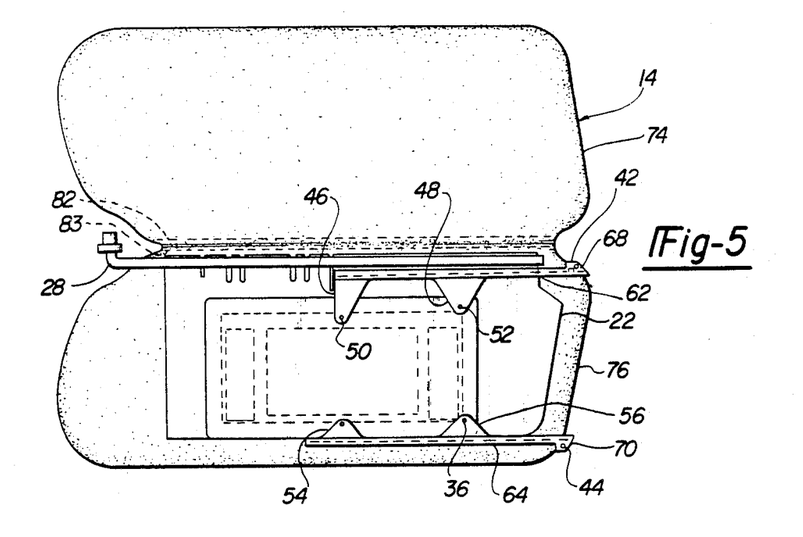
FIG. 5 is a plan view showing a right hand visor in an intermediate stage of assembly with the inner board assembly inserted into the outer board assembly while the latter is in an opened condition.
Figure 6:
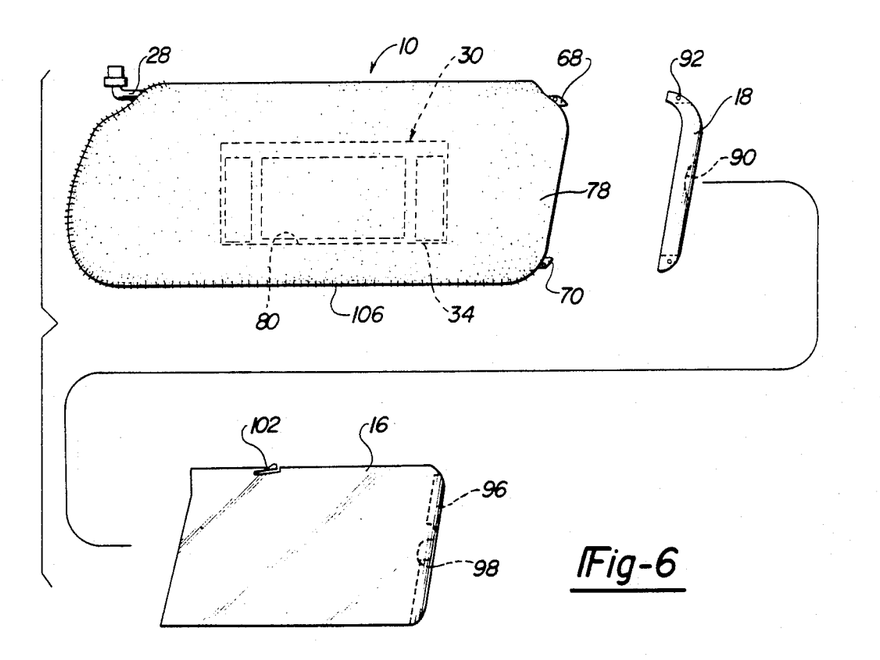
FIG. 6 is an exploded plan view showing installation of the auxiliary glare shield and edge cap member according to a first embodiment of the present invention.

With particular reference to FIGS. 5 and 6, a preferred assembly sequence for visor 10 will be described. Outer fabric 78 is assembled to fiberboard 72 with opening aligned and trim edges folded over and bonded. Center board assembly 12 is then placed on the inside surface of outer board leaf 76, and mirror assembly 30 is attached by pressing posts 36 through hole 38 in outer board leaf 76 and in center board assembly 12. Guides 42 and 44 are pushed on posts 36 which are then heat sealed and the leaves are folded together along lines 82 and 83, as shown in FIG. 6. Next, the perimeter edges of leaves 74 and 76 are connected by stitching 106 around one side and the lower edge of the visor, stopping short of the side area which edge cap 18 encompasses. Thereafter, edge cap 18 is installed so it engages the guide ends 68 and 70. Fastening means are installed within holes 92 to secure the components together. Due to the provision of channels 86 and 88, the trimmed edge of material 78 is enveloped and secured by edge cap 18, preventing the trim material from fraying or coming loose. Once edge cap 18 is installed, glare shield 16 can be inserted. Glare shield 16 passes through edge cap central slot 84 and engages tracks 62 and 64. Insertion of glare shield 16 causes tab 102 to become deflected through engagement with ramped surface 110 and can thereafter be fully inserted into visor assembly 10.

During use, the operator merely grasps rib 96 of auxiliary glare shield 16 to deploy it to the desired extended position. However, complete removal of glare shield 16 is prevented since tab end surface 108 engages the pocket 66 if the glare shield is attempted to be fully withdrawn. Accordingly, the provision of tab 102 and pocket 66 prevents inadvertent disassembly of glare shield 16 from the visor assembly.

Now with reference to FIGS. 7 through 12, a second embodiment of a visor assembly will be described which is generally designated by reference number 120. Components and features of visor assembly 120 which are identical to those of visor 10 are identified by like reference numbers. Visor 120 differs from that previously described in that a modified edge cap assembly 122 is provided having halves 124 and 126 which snap together. Edge cap assembly 122 is installed such that it is completely embedded within visor 120 and hidden from view while guiding auxiliary glare shield 130 and reinforcing the glare shield opening. For this embodiment, outer board assembly leaves 127 and 129 have a plurality of slots 128 cut into the end from which auxiliary glare shield 130 protrudes. Each of edge cap halves 124 and 126 have internal cavities 132 defined by separated wall surfaces 133 and 135 with separating webs 137 therebetween. Cavities 132 match the configuration of the end of leaves 127 and 129 so the edge cap halves can slide onto the leaves.

Figure 7:
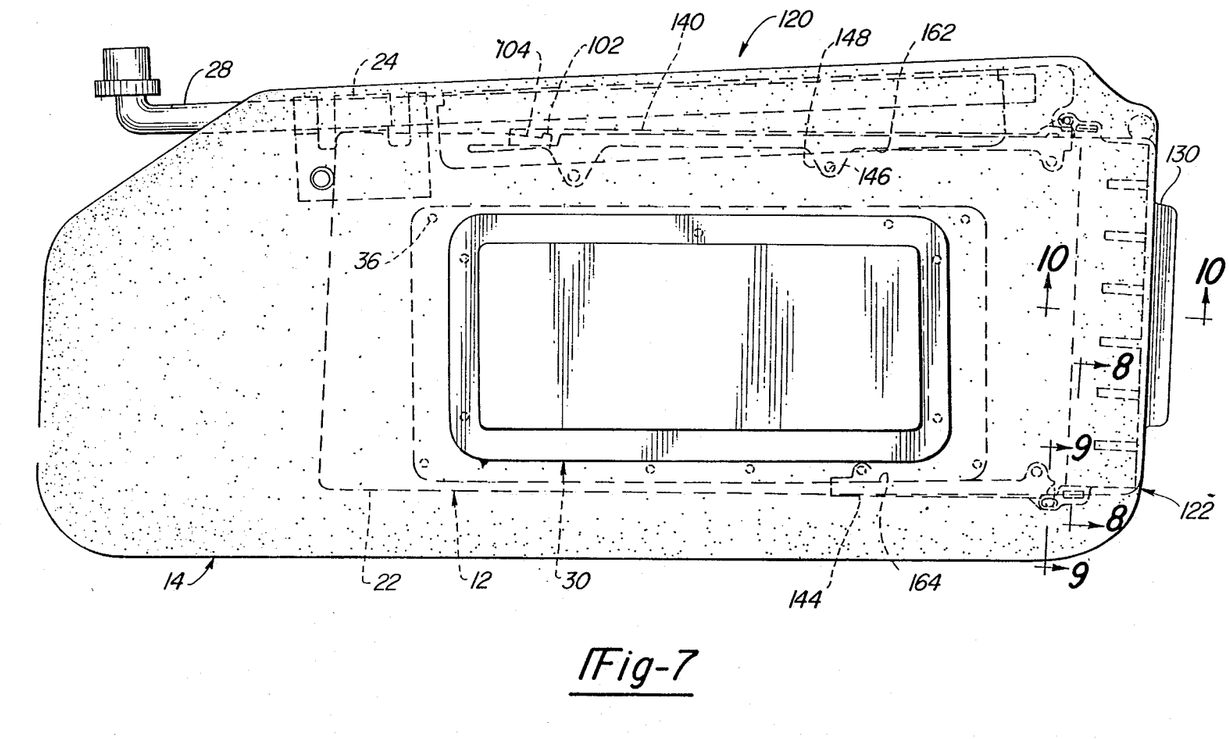
FIG. 7 is a plan view of an improved visor assembly according to a second embodiment of this invention showing in phantom lines the profiles of various internal components of the visor assembly and featuring an internal edge cap member.
Figures 8, 9, 10, 11, 12:
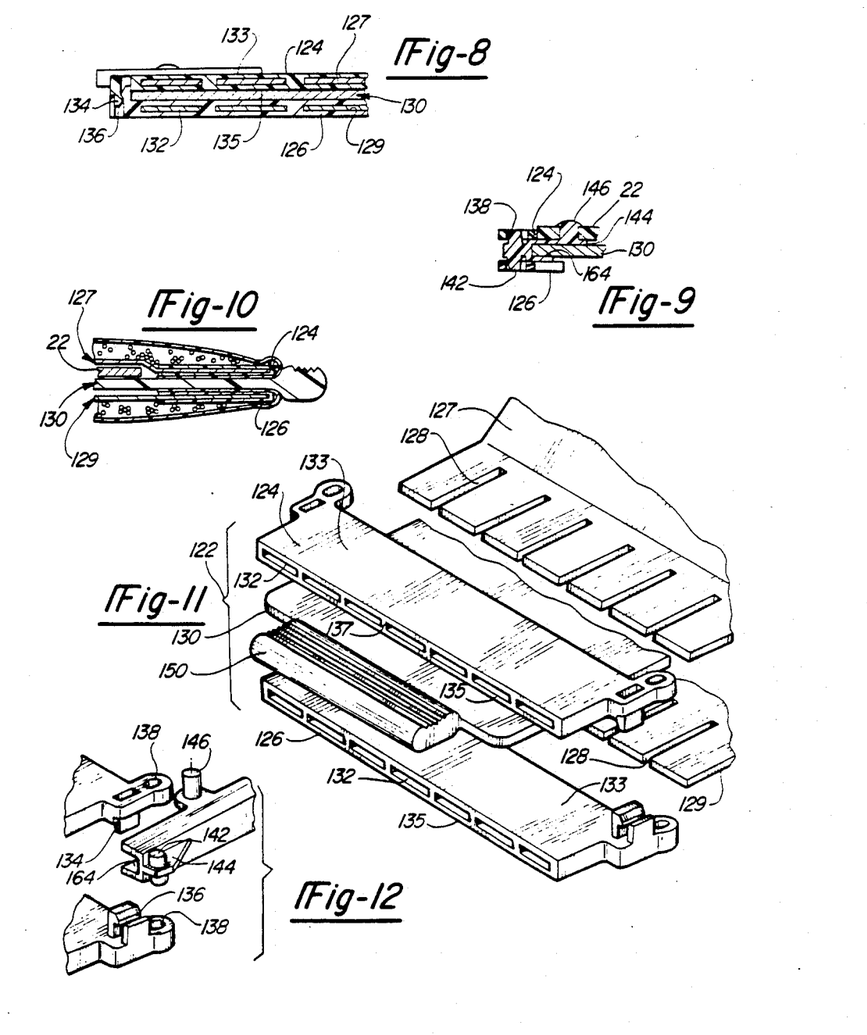
FIG. 8 is a cross-sectional view taken along line 8—8 from FIG. 7.
FIG. 9 is a cross-sectional view taken along line 9—9 of FIG. 7.
FIG. 10 is a cross-sectional view taken along line 10—10 of FIG. 7.
FIG. 11 is an exploded pictorial view showing the components making up the edge cap member according to the second embodiment.
FIG. 12 is a pictorial exploded view showing the assembly of the halves making up the edge cap member.

FIG. 11 shows edge cap halves 124 and 126 removed from leaves 127 and 129, whereas FIG. 7 shows them in an assembled condition. The ends of halves 124 and 126 have interfitting connecting features. As shown in FIGS. 8 and 12, one end has a protruding tab 134 which snaps into engagement with slot 136 formed on the other end of the mating part. The ends of halves 124 and 126 further include eyes 138 which clamp against and restrain tapered coupling post 142 best shown in FIG. 12. Posts 142 are received by eyes 138 and align the channel slot in track 164 with the space between edge cap halves 124 and 126 to allow passage of shield 130. Protruding posts 146 on guides 140 and 144 are received by holes in center board 22. At assembly, the top of posts 146 are heat staked for connection of the track members 162 and 164 to center board 22. Following installation of edge cap halves 124 and 126, the outer soft trim 78 is folded over the outer board leaves 127 and 129 and bonded, after which the cap halves 124 and 126 are sewn in place. Then the center board assembly 22 which includes the tracks is placed on the inside surface of leaves 127 and 129, mirror assembly posts 36 are pressed through both the outer and center board assemblies and are heat staked. Then the outer leaves 127 and 129 are folded together, the posts 142 entering the holes 138 which guarantees the alignment of tabs 134 with slots 136 which are now snapped together securing the opening in the visor end for subsequent entry of the glare shield 130. The outer board leaves 127 and 129 are now bonded or sewn together, and insertion of the glare shield 130 completes the assembly. For this embodiment, auxiliary glare shield 130 has a somewhat modified pull tab 150 as compared with the embodiment described previously.

FIG. 10 shows finishing of the soft trim with the fabric edge being wrapped around the end of the visor and into the slot provided for movement of glare shield 130. As shown in FIG. 10, edge cap assembly 122 is completely covered by soft trim and therefore not visible to the user. Edge cap assembly halves 124 and 126 are preferably made of a soft plastic material which enables machine sewing directly through the outer board assemblies at the visor edge as shown in FIG. 10. Bonding or other processes can be used to secure the trim material.

It is obvious that the above construction for a horizontally articulated glare shield may be applied to either or both ends of the visor and that a similar vertical construction would allow a glare shield depending from the bottom edge of the visor; or any combination of the three. While the above description constitutes the preferred embodiments of the present invention, it will be appreciated that the invention is susceptible to modification, variation and change without departing from the proper scope and fair meaning of the accompanying claims.

What is claimed is:

1. A visor for a motor vehicle having an auxiliary glare shield comprising:
   an inner board,
   an outer board having two leaves with generally symmetrical outlines which are folded and fastened together to envelop said inner board to form said visor having first and second opposite side edges and a bottom edge,
   upper and lower guide tracks carried by said inner board and having ends extending to said first side edge,
   an end cap attached to said outer board leaves adjacent said first side edge and having a central slot, wherein said end cap forms a pair of channels for receiving each of said leaves of said outer board assembly along said first side edge and separating said leaves to provide clearance for sliding movement of said glare shield, and
   said auxiliary glare shield retained between said outer board leaves and slidable through said end cap slot and guided between retracted and extended positions by said guide tracks.

2. A visor according to claim 1 further comprising stitching along the said outer board assembly second side edge and said bottom edge for fastening said leaves together.

3. A visor according to claim 1 further comprising bonding along the said outer board assembly second side edge and said bottom edge for fastening said leaves together.

4. A visor for a motor vehicle comprising;
   an inner board,
   an outer board having two leaves with generally symmetrical outlines which are folded and fastened together to envelop said inner board to form said visor having first and second opposite side edges and a bottom edge,
   soft trim material covering said outer board,
   upper and lower guide tracks carried by said inner board and having ends extending to said first side edge,
   an end cap having a pair of channels for receiving said outer board first end and for pinching said soft trim against said outer board, said end cap defining a slot between said channels, and
   an auxiliary glare shield retained between said outer board leaves and slidable through said end cap slot and guided between retracted and extended positions by said guide tracks.

5. A visor according to claim 4 further comprising connecting means for attaching said upper and lower guide tracks to said end cap.

6. A visor according to claim 4 further comprising stitching along the said outer board assembly second side edge and said bottom edge for fastening said leaves together.

7. A visor according to claim 4 further comprising bonding along the said outer board assembly second side edge and said bottom edge for fastening said leaves together.

8. A visor according to claim 4 further comprising engaging means formed by said glare shield and at least one of said guide track for enabling said glare shield to be installed by insertion through said end cap slot into engagement with said guide tracks, and thereafter preventing removal of said glare shield from engagement with said guide tracks.

9. A visor according to claim 8 wherein at least one of said guide tracks forms a local pocket and said glare shield has a tab along an edge thereof, said tab deflecting upon installation of said glare shield within said end cap slot and engaging said pocket upon extension of said glare shield to prevent said glare shield from becoming removed from said guide tracks.

10. A visor according to claim 4 wherein said inner board further comprises a mirror assembly mounted to said inner board by a plurality of posts extending through holes in said inner board and wherein said guide tracks are affixed to said inner board by said posts and disposed on the opposite surface of said inner board from said mirror assembly.

11. A visor for a motor vehicle comprising;
    an inner board,
    an outer board having two leaves with generally symmetrical outlines which are folded and fastened together to envelop said inner board to form said visor having first and second opposite side edges and a bottom edge,
    soft trim material covering said outer board,
    upper and lower guide tracks carried by said inner board and having ends extending to said first side edge,
    an end cap having a pair of double wall halves with an inside cavity for receiving said outer board leaves such that inside and outside surfaces of said leaf first ends are covered by said end cap and said soft trim covering said end cap whereby said end cap is substantially completely covered by said soft trim, and
    an auxiliary glare shield retained between said outer board leaves and slidable through said end cap slot and guided between retracted and extended positions by said guide tracks.

12. A visor according to claim 11 further comprising stitching along the said outer board assembly second side edge and said bottom edge for fastening said leaves together.

13. A visor according to claim 11 further comprising bonding along the said outer board assembly second side edge and said bottom edge for fastening said leaves together.

14. A visor according to claim 11 further comprising engaging means formed by said glare shield and at least one of said guide track for enabling said glare shield to be installed by insertion through said end cap slot into engagement with said guide tracks, and thereafter preventing removal of said glare shield from engagement with said guide tracks.

15. A visor according to claim 14 wherein at least one of said guide tracks forms a local pocket and said glare shield has a tab along an edge thereof, said tab deflecting upon installation of said glare shield within said end cap slot and engaging said pocket upon extension of said glare shield to prevent said glare shield from becoming removed from said guide tracks.

16. A visor according to claim 11 wherein said inner board further comprises a mirror assembly mounted to said inner board by a plurality of posts extending through holes in said inner board and wherein said guide tracks are affixed to said inner board by said posts and disposed on the opposite surface of said inner board from said mirror assembly.

17. A visor according to claim 11 wherein said end cap forms a plurality of cavities separated by webs and said leaf first ends have a plurality of slots wherein said webs are received by said slots.

18. A visor according to claim 11 wherein said end cap is comprised of two halves which have interfitting features which snap together said halves at their ends.

19. A method of assembling a visor for a motor vehicle comprising the steps of:
   providing an inner board member,
   providing an outer board member forming two leaves having generally symmetrical outlines joined at one or more crease lines and adapted to be folded together to define first and second side edges and a lower edge,
   providing an upper and lower guide track carried by said inner board and forming ends extending to said first side edge thereof,
   providing an end cap having a pair of channels with a central slot therebetween,
   providing an auxiliary glare shield having means cooperating with at least one of said guide tracks for allowing said shield to be inserted within said end cap slot and preventing said shield from becoming detached from said tracks,
   inserting said inner board within said outer board member,
   folding said outer board member about said crease line to envelop said inner board member,
   affixing the perimeter of said outer board member together along said second side edge and said bottom edge,
   fastening said end cap to said visor first side edge by affixing said cap to said guide track ends, and
   inserting said glare shield within said end cap slot.

20. A method of assembling a visor for a motor vehicle comprising the steps of:
   providing an inner board member,
   providing an outer board member forming two leaves having generally symmetrical outlines joined at one or more crease lines and adapted to be folded together to define first and second side edges and a lower edge, said outer board member further being covered with a soft trim material,
   providing an upper and lower guide track carried by said inner board and forming ends extending to said first side edge thereof,
   providing an end cap assembly having a pair of havles, each having a channel and wherein when said halves are assembled together, they define a central slot therebetween for receiving portions of said leaves,
   inserting portions of said leaves adjacent said first edge into said end cap halves with said soft trim material covering said edge cap halves,
   providing an auxiliary glare shield having means cooperating with at least one of said guide tracks for allowing said shield to be inserted within said end cap slot and preventing said shield from becoming detached from said tracks,
   inserting said inner board within said outer board member,
   folding said outer board member about said crease line to envelop said inner board member and mating said end cap halves together,
   affixing the perimeter of said outer board member together along said second side edge and said bottom edge,
   affixing said soft trim material to said end cap halves thereby concealing said end cap assembly, and
   inserting said glare shield within said end cap slot.

21. A visor for a motor vehicle comprising:
   an inner board,
   an outer board having two leaves with generally symmetrical outlines which are folded and fastened together to envelop said inner board to form said visor having first and second opposite side edges and a bottom edge,
   upper and lower guide tracks carried by said inner board and having ends extending to said first side edge,
   an end cap attached to said outer board leaves adjacent said first side edge and having a central slot,
   an auxiliary glare shield retained between said outer board leaves and slidable through said end cap slot and guided between retracted and extended positions by said guide tracks, and
   engaging means formed by said glare shield and at least one of said guide track for enabling said glare shield to be installed by insertion through said end cap slot into engagement with said guide tracks, and thereafter preventing removal of said glare shield from engagement with said guide tracks.

22. A visor according to claim 21 further comprising stitching along the said outer board assembly second side edge and said bottom edge for fastening said leaves together.

23. A visor according to claim 21 further comprising bonding along the said outer board assembly second side edge and said bottom edge for fastening said leaves together.

24. A visor for a motor vehicle comprising:
   an inner board,
   an outer board having two leaves with generally symmetrical outlines which are folded and fastened together to envelop said inner board to form said visor having first and second opposite side edges and a bottom edge,
   upper and lower guide tracks carried by said inner board and having ends extending to said first side edge,
   an end cap attached to said outer board leaves adjacent said first side edge and having a central slot,
   an auxiliary glare shield retained between said outer board leaves and slidable through said end cap slot and guided between retracted and extended positions by said guide tracks, and
   a mirror assembly mounted to said inner board by a plurality of posts extending through holes in said inner board and wherein said guide tracks are affixed to said inner board by said posts and disposed on the opposite surface of said inner board from said mirror assembly.

25. A visor according to claim 24 further comprising stitching along the said outer board assembly second side edge and said bottom edge for fastening said leaves together.

26. A visor according to claim 24 further comprising bonding along the said outer board assembly second side edge and said bottom edge for fastening said leaves together.

27. A visor for a motor vehicle comprising:
an inner board,
an outer board having two leaves with generally symmetrical outlines which are folded and fastened together to envelop said inner board to form said visor having first and second opposite side edges and a bottom edge,
soft trim covering said leaves,
upper and lower guide tracks carried by said inner board and having ends extending to said first side edge,
an end cap attached to said outer board leaves adjacent said first side edge and having a central slot, wherein said end cap has a pair of separated channels which receive said leaves first ends and said soft trim is wrapped over said end cap whereby said end cap is substantially completely covered by said soft trim, and
an auxiliary glare shield retained between said outer board leaves and slidable through said end cap slot and guided between retracted and extended positions by said guide tracks.

28. A visor according to claim 27 further comprising stitching along the said outer board assembly second side edge and said bottom edge for fastening said leaves together.

29. A visor according to claim 27 further comprising bonding along the said outer board assembly second side edge and said bottom edge for fastening said leaves together.

30. A visor according to claim 21 wherein at least one of said guide tracks forms a local pocket and said glare shield has a tab along an edge thereof, said tab deflecting upon installation of said glare shield within said end cap slot and engaging said pocket upon extension of said glare shield to prevent said glare shield from becoming removed from said guide tracks.

31. A visor according to claim 27 wherein said channels form a plurality of cavities separated by webs and said leaf first ends have a plurality of slots wherein said webs are received by said slots.

32. A visor according to claim 27 wherein said end cap is comprised of two halves which have interfitting features which snap together said halves at their ends.

* * * * *